J. D. HASLETT.
HASP.
APPLICATION FILED JUN. 25, 1920.

1,371,087.

Patented Mar. 8, 1921.

Inventor:
John D. Haslett,
By Chas. N. Butler
Attorney.

UNITED STATES PATENT OFFICE.

JOHN D. HASLETT, OF PHILADELPHIA, PENNSYLVANIA.

HASP.

1,371,087.

Specification of Letters Patent.   Patented Mar. 8, 1921.

Application filed June 25, 1920. Serial No. 391,701.

*To all whom it may concern:*

Be it known that I, JOHN D. HASLETT, a citizen of the United States, residing at Philadelphia, in the county of Philadelphia and State of Pennsylvania, have invented certain Improvements in Hasps, of which the following is a specification.

My invention is a hasp having means connected thereto, preferably formed integrally therewith for providing simply and economically a convenient hand-hold by which a door, shutter, lid or the like, to which the hasp is secured, can be operated readily.

Figure 1:
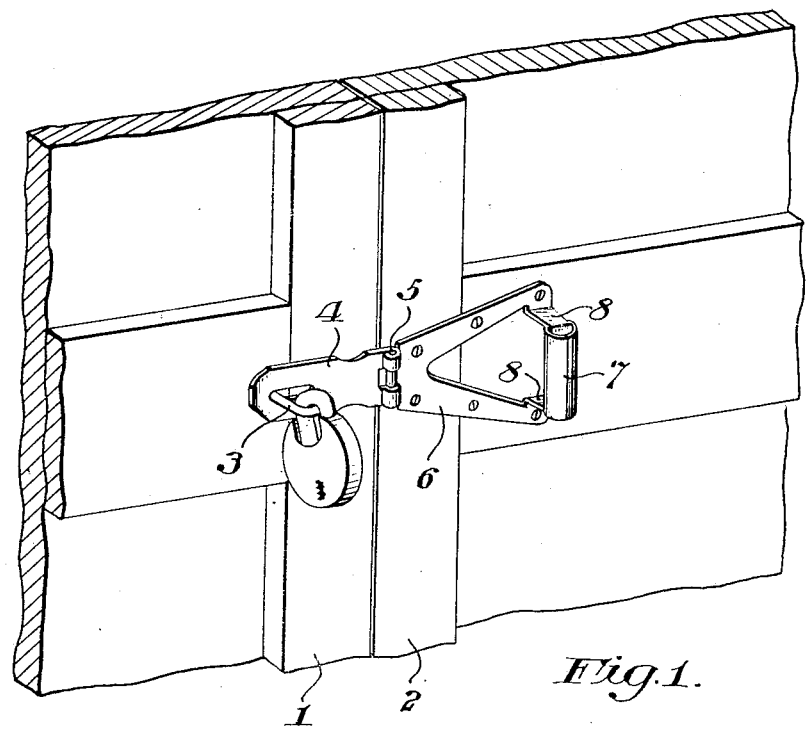
Figure 2:
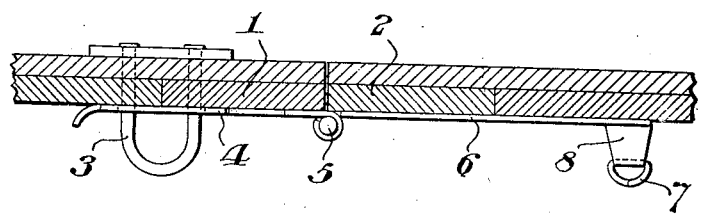

In the accompanying drawings, Figure 1 is a broken perspective view of a construction having my improved hasp applied thereto, and Fig. 2 is a top plan view of the same.

The drawing illustrates a pair of members 1 and 2, the latter of which is movable with relation to the former. The member 1 is provided with a staple 3 on which is engaged the hasp member 4, the latter being hinged by means of a pintle 5 to the member 6 fixed to the door or lid 2. This member 6, as shown, is approximately V-shaped and has the extremities of its bifurcations integrally connected to the handle 7, the members 8 extending laterally to and between the members 6 and 7, the parts 7 and 8 being formed integrally with the part 6, preferably by stamping out a blank from sheet metal and pressing the construction to form.

It will be understood that this work can be done very inexpensively with the production of a simple and convenient construction having a rolled handle providing a hand-hold through which the necessary force can be applied to open or close the member 2.

Having described my invention, I claim:

1. A hasp having a movable part and a second part to which said movable part is hinged, said second part having bifurcations and a handle integrally connected therewith.

2. A hasp having a part comprising integrally formed bifurcations and a handle connecting said bifurcations with a part hinged to said part first named.

In testimony whereof I have hereunto set my name this 19th day of June, 1920.

JOHN D. HASLETT.